United States Patent
Bradshaw

Patent Number: 5,425,269
Date of Patent: Jun. 20, 1995

[54] METHOD OF AND APPARATUS FOR DISCRIMINATING MISFIRE

[75] Inventor: Benjamin J. Bradshaw, Solihull, England

[73] Assignee: Lucas Industries Public Limited Company, England

[21] Appl. No.: 134,219

[22] Filed: Oct. 12, 1993

[30] Foreign Application Priority Data

Oct. 21, 1992 [GB] United Kingdom ............... 9222072

[51] Int. Cl.$^6$ .................................................. G01M 15/00
[52] U.S. Cl. ................................................... 73/117.3
[58] Field of Search ............... 73/116, 117.1, 117.2, 73/117.3; 364/431.07, 431.08

[56] References Cited

U.S. PATENT DOCUMENTS

| | | | |
|---|---|---|---|
| 5,041,979 | 8/1991 | Hirka et al. ........................ | 73/116 |
| 5,088,318 | 2/1992 | Osawa ............................... | 73/117.3 |
| 5,200,899 | 4/1993 | Ribbens et al. ................... | 73/117.3 |
| 5,207,091 | 5/1993 | Shibata et al. .................... | 73/117.3 |
| 5,216,915 | 6/1993 | Sakamoto .......................... | 73/117.3 |
| 5,222,392 | 6/1993 | Baba et al. ........................ | 73/116 |
| 5,263,453 | 11/1993 | Wakahara et al. ................ | 73/117.3 |

FOREIGN PATENT DOCUMENTS 0437212 1/1991 European Pat. Off. .
0442687 2/1991 European Pat. Off. .

Primary Examiner—Richard E. Chilcot, Jr.
Assistant Examiner—George M. Dombroske
Attorney, Agent, or Firm—Andrus, Sceales, Starke & Sawall

[57] ABSTRACT

A series of engine speed changes is analysed in order to detect a sequence of speed changes characteristic of a misfire having occurred. An embodiment of the invention generates a first mask in response to speed increases and a second mask in response to speed decreases. A misfire can only be signalled when both masks are at a PASS state and misfire detector detects a misfire.

14 Claims, 4 Drawing Sheets

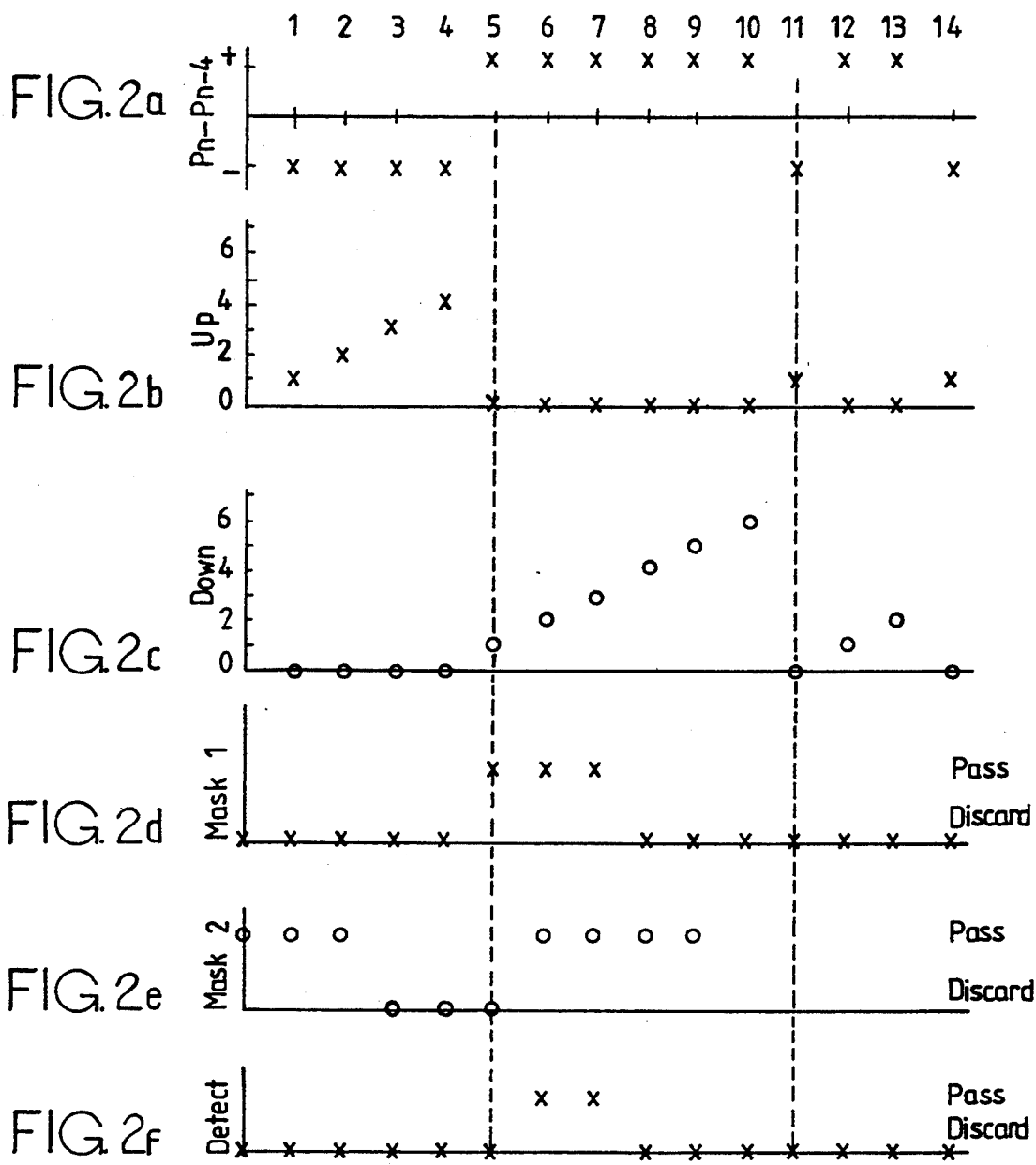

METHOD OF AND APPARATUS FOR DISCRIMINATING MISFIRE

The present invention relates to a method of and apparatus for discriminating misfire in an internal combustion engine.

Known misfire detection systems are based on crankshaft speed changes. The crankshaft speed may be measured by a variable reluctance transducer responsive to the passage of teeth of a toothed wheel mounted on an engine output shaft. It is known to process the output of the transducer so as to detect misfires while providing a degree of integrity against spurious detection, as described in EP-A-0 442 687.

According to a first aspect of the present invention there is provided a method of improving reliability, of detection of misfire in an internal combustion engine, comprising examining a plurality of preceding engine speed changes to identify a pattern of speed changes characteristic of a misfire and signalling a misfire when both a misfire detector detects a misfire and the pattern of speed changes is present.

Preferably the pattern of speed changes comprises first and second patterns of speed changes.

Advantageously the first pattern is identified by applying a first generating rule to a sequence of outputs of an up-count. The up-count may be incremented when an Nth period is less than a (N-X)th period, where N and X are integers and X is less than N.

The engine speed may be measured by measuring the time difference between the passage of two reference points on a cyclically moving part of the engine past a sensor. Advantageously the same reference points are used for each engine speed comparison, to avoid variation caused by variation of the relative positions of the reference points.

Respective reference points may be provided at first and second positions relative to the top dead center position of respective cylinders of a multi-cylinder engine.

The first generating rule may be application specific. For example, an eight cylinder internal combustion engine may have a first generating rule which inhibits the detection of misfires occurring at the N, N-1, N-2 and N-3 combustion events adjacent the N, N-1, N-2 and N-3 periods when the up-count is greater than or equal to one.

Advantageously the second pattern is obtained by applying a second generating rule to a sequence of outputs of a down-count. The down count may be incremented when an Nth period is greater than or equal to a (N-Y)th period, where N and Y are integers and Y is less than N. The down-count may be reset to zero when the up-count is incremented. The up-count may be reset to zero when the down-count is incremented. X and Y may be equal.

The second generating rule may be application specific. For example, an eight cylinder internal combustion engine may have a second generating rule which inhibits detection of a misfire occurring at an N-5th combustion event when the down count is greater than or equal to 4.

According to a second aspect of the present invention there is provided a method of discriminating misfire in an internal combustion engine, comprising making a series of measurements representing engine speed; determining a series of speed differences from the series of speed measurements; inhibiting detection of misfire in response to a first pattern of values of speed differences which are greater than or equal to a first threshold where the first threshold is greater than or equal to zero; and inhibiting detection of misfire in response to detection of a second pattern of values of speed differences which are less than or equal to a second threshold, where the second threshold is less than or equal to zero.

Preferably the occurrence of a misfire is detected based on a series of engine speed measurements. A method of using speed measurements to determine the occurrence of a misfire is disclosed in EP-A-0 442 687.

According to a third aspect of the present invention there is provided an apparatus for improving reliability of detection of misfire in an internal combustion engine, comprising examining means for examining a plurality of preceding engine speed changes to identify a pattern of speed changes characteristic of a misfire and signalling means for signalling a misfire when both a misfire detector has detected a misfire and the pattern of speed changes is present.

According to a fourth aspect of the present invention there is provided an apparatus for discriminating misfire in an internal combustion engine, comprising an engine speed sensor for making a series of measurements representing engine speed; means for determining a series of speed differences from the series of speed measurements; first inhibiting means for inhibiting detection of misfire in response to a first pattern of values of speed differences which are greater than or equal to a first threshold where the first threshold is greater than or equal to zero; and second inhibiting means for inhibiting detection of misfire in response to detection of a second pattern of values of speed differences which are less than or equal to a second threshold, where the second threshold is less than or equal to zero.

It is thus possible to reduce the likelihood of falsely detecting a misfire as a result of transient operating conditions within a vehicle such as substantial accelerations or substantial decelerations resulting from the actions of the driver or engine control circuits, changes in engine load or motion of a vehicle powered by an internal combustion engine over a rough or uneven surface.

The present invention will further be described, by way of example, with reference to the accompanying drawings, in which:

FIGS. 2a to 2f are timing diagrams of variables within an apparatus for improving the detection of misfire;

Figure 1:
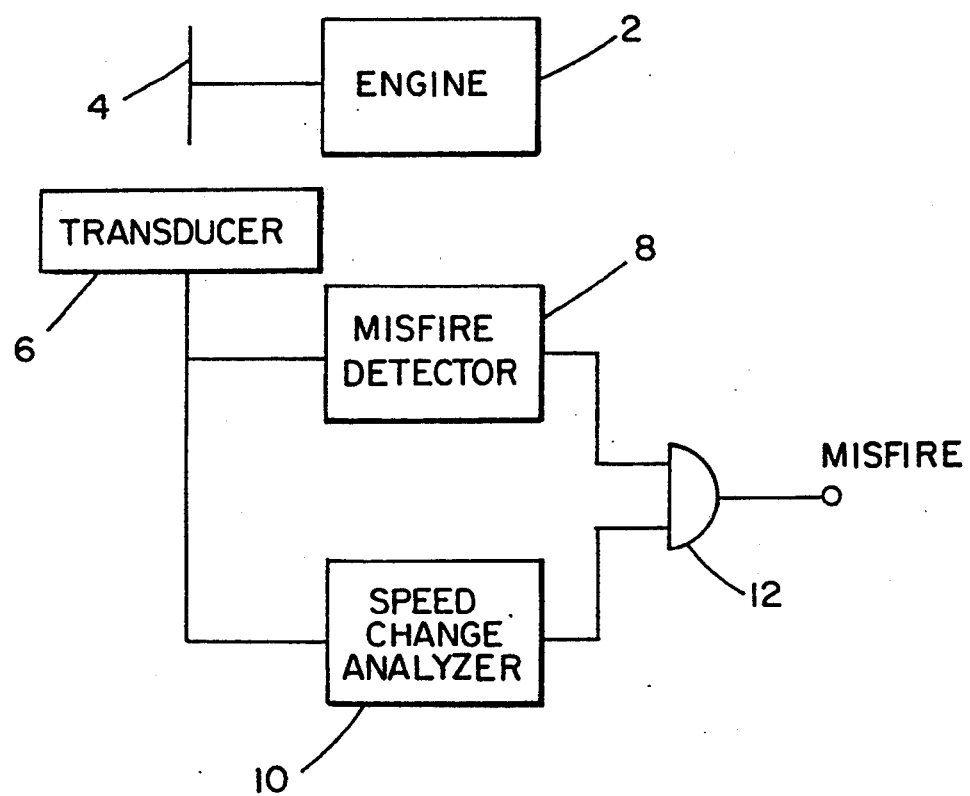
FIG. 1 is a schematic diagram of an engine including an embodiment of the present invention.

As shown in FIG. 1, a toothed wheel 4 is driven by an output shaft of an engine 2. A variable reluctance transducer 6 is adjacent the toothed wheel 4 and is responsive to the passage of the teeth. An output of the transducer 6 is provided to a misfire detector 8, for example, as described in EP-A-0 442 687. The output of the transducer 6 is also supplied to an engine speed change analyser 10 constituting an embodiment of the present invention. Outputs of the misfire detector 8 and the analyser 10 are supplied as inputs of an AND gate 12.

The output of the AND gate 12 is used to signal the occurrence of a misfire. A misfire can only be signalled when the misfire detector 8 has detected a misfire and the analyser 10 has recognized a sequence of engine speed variations which are consistent with the occurrence of a misfire.

The misfire detector 8 and the analyser 10 are conveniently embodied within a digital data processor.

The output of the sensor 6 is representative of the period required for successive teeth to pass the sensor. It is convenient to perform the misfire detection and engine speed analysis in terms of the inter-tooth periods rather than converting to engine speed.

For an 8 cylinder engine, the misfire detector 8 may keep a record of the present and recent inter-tooth periods. The periods are measured between first and second teeth. The first and second teeth are in the same positions relative to top dead center (TDC) for each cylinder. The teeth need not be neighbouring teeth of the toothed wheel 4.

Misfire may be detected by comparing the result of $P_N-P_{N-1}-P_{N-4}+P_{N-5}$ with a threshold. $P_N$ represents the most recent inter-tooth period. $P_{N-1}$ is the inter-tooth period immediately preceding the $P_N$ period, and so on. A misfire is indicated when the result of the calculation exceeds the threshold.

The engine speed change analyser 10 forms two masks in response to predetermined patterns of engine speed changes. FIG. 2a shows synthesised data showing the results of 14 speed change calculations by the analyser 10. The analyser 10 compares the $P_N$th period with the $P_{N-4}$th period. An UP-COUNTER and a DOWN-COUNTER are controlled in response to the result of the comparison shown in FIG. 2a.

If $P_N-P_{N-4}$ is greater than or equal to zero, i.e. engine speed has decreased, the UP-COUNTER is reset to zero and the DOWN-COUNTER is incremented. The UP-COUNTER is incremented and the DOWN-COUNTER is reset if $P_N-P_{N-4}$ is less than zero, i.e. the engine speed has increased. FIGS. 2b and 2c show the values of the UP-COUNTER and the DOWN-COUNTER, respectively, in response to the comparisons of inter-tooth periods.

Two masks are formed from the values of the UP-COUNTER and the DOWN-COUNTER. The first mask is dependent on the value of the UP-COUNTER. If the UP-COUNTER has a value greater than or equal to one, then misfires detected for the N, N-1, N-2 and N-3 combustion events are discarded.

The second mask is dependent on the DOWN-COUNTER. If the DOWN-COUNTER has a value greater than or equal to four, then misfires detected for the N-5th combustion event are discarded.

The result of the comparison $P_N-P_{N-4}$ for the first comparison of FIG. 2a is negative, i.e. less than zero. Consequently the UP-COUNTER is incremented to take a value of 1 and the DOWN-COUNTER is reset. The first mask is set to "discard" for the 1st period and the second mask is set to "pass". The result of the comparison $P_N-P_{N-4}$ remains negative for the 2nd, 3rd and 4th comparisons. The UP-COUNT is incremented, but, thus far, the statuses of the masks are not changed.

The result of $P_N-P_{N-4}$ becomes greater than zero at comparison 5 (N+5). The UP-COUNTER is reset and the DOWN-COUNTER is incremented, taking a value of one. The first mask is set to "pass" as is the second mask. The result of $P_N-P_{N-4}$ remains positive for the 6th and 7th comparisons. The DOWN-COUNTER is incremented at each comparison.

At the 8th comparison $P_N-P_{N-4}$ remains positive. The DOWN-COUNTER is incremented once again and now holds a value of 4. The rule for the second mask is that misfires in the N-5th period should be ignored if DOWN-COUNT$\geq$4. Consequently the second mask is retrospectively set to "discard" for the combustion event associated with the 3rd comparison.

The result of $P_N-P_{N-4}$ remains positive for the 9th and 10th comparisons, thus the DOWN-COUNTER is further incremented and the 4th and 5th combustion events of the second mask are set to "discard". The UP-COUNTER remains at zero.

At the 11th comparison, $P_N-P_{N-4}$ is negative. The DOWN-COUNTER is reset and the UP-COUNTER is incremented. Since the DOWN-COUNTER has a value of zero, the second mask is set to "pass" for the th combustion event. The UP-COUNTER has a value of one, and consequently the first mask is set to discard misfires occurring at the 11th, 10th, 9th and 8th combustion events.

For the 12 and 13th periods, the comparison $P_N-P_{N-4}$ is positive. The UP-COUNTER is reset and the DOWN-COUNTER is incremented at each period. The first mask is set to "pass" for the 12th and 13th combustion events and the second mask is set to "pass" for the 7th and 8th combustion events, because the value of the DOWN-COUNTER is less than 4.

At the 14th comparison $P_N-P_{N-4}$ is negative. The DOWN-COUNTER is reset to zero and the second mask is set to "pass" for the 9th combustion event. The UP-COUNTER is incremented and consequently the first mask is set to "discard" for the 14th, 13th, 12th and 11th combustion events.

Because the example does not continue beyond the 14th period it is not possible to define the status of the second mask for the 10th and subsequent combustion events.

The first and second masks must both be set to "pass" for a given combustion event if a misfire there is to be counted. Only misfires occurring during combustion events 6 and 7 in the example would be counted, as shown in FIG. 2f.

Because the Nth comparison can affect the masks for the preceding 5 combustion events, it is not possible to detect misfires immediately. The output of the misfire detector has to be delayed for 5 combustion events and is then ANDed with the first and second masks.

Figure 3A:
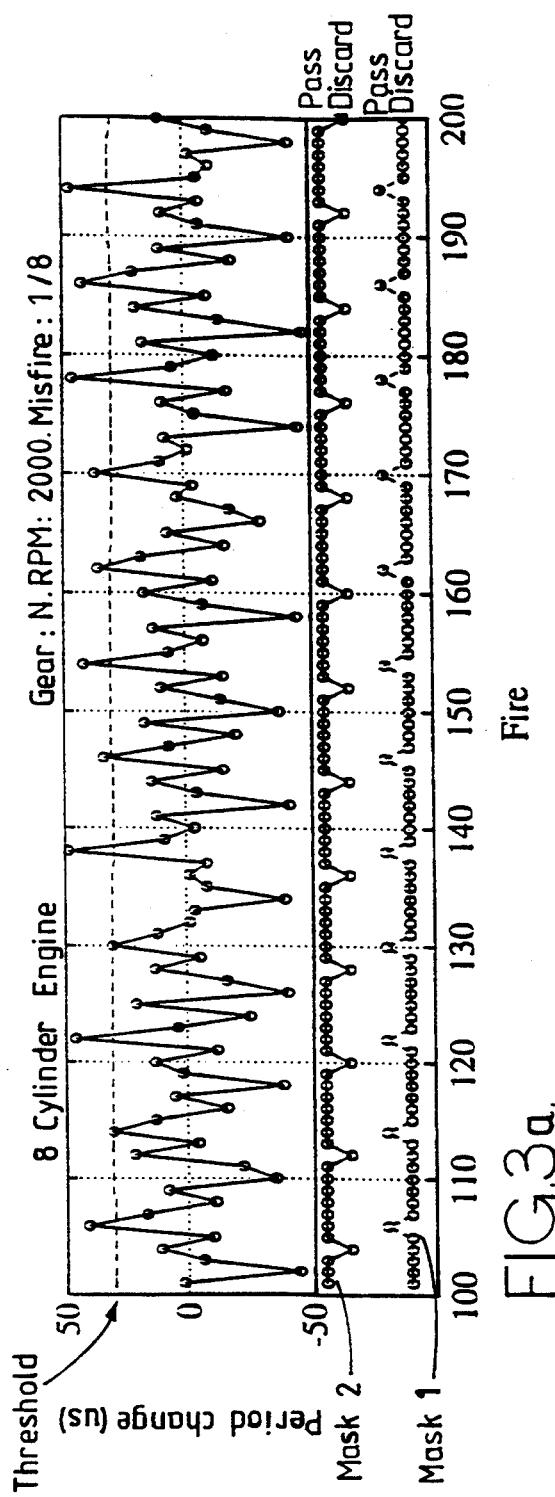
FIGS. 3a and 3b show data from an experiment using an 8 cylinder engine misfiring at every 8th combustion event.

FIG. 3a shows the result of the calculation within the misfire detector 8. The engine is an 8 cylinder engine. The data were taken with the engine having a misfire occurring for every 8th combustion event. The engine was in neutral so as remove the effect of drive line resonance and was running at a nominally constant 2000 RPM. The detector 8 signals a misfire when the calculated period change exceeds the threshold value. Note that FIG. 3a does not show the actual period change for consecutive inter-tooth periods. It may be seen that under these conditions each indicated misfire is correctly allowed by masks 1 and 2.

Figure 3B:
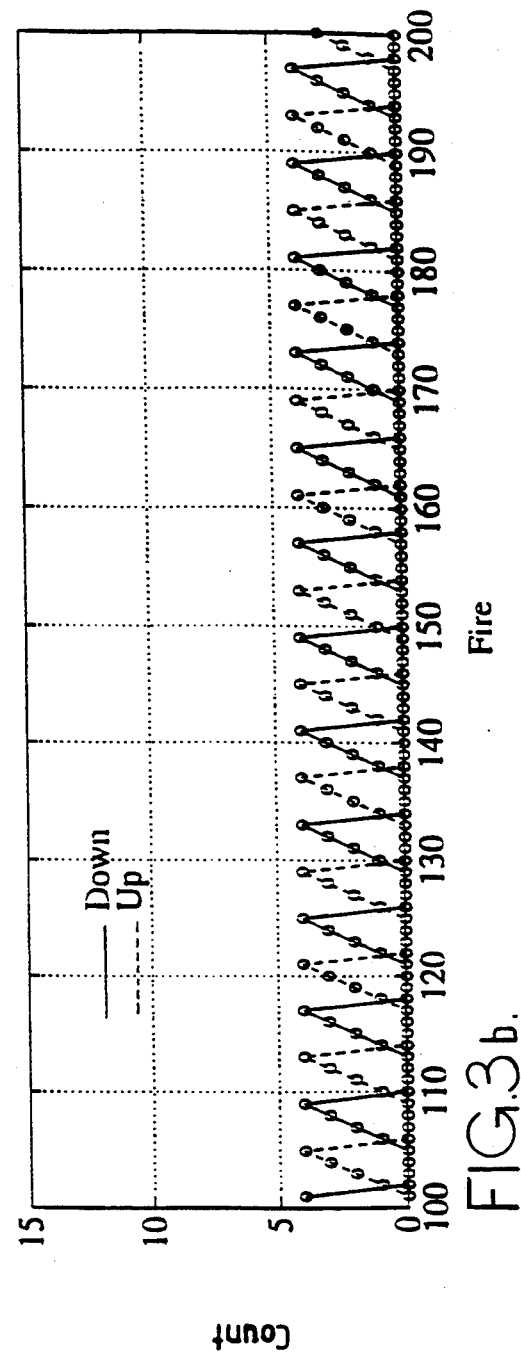

FIG. 3b shows the values of the UP-COUNTER and the DOWN-COUNTER. The values of the masks determined from the counters are indicated in FIG. 3a. Both masks are in the "pass" state for the combustion events that suffered misfires.

When the engine is subjected to transient or non-steady state operating conditions, the misfire detector 8 may indicate a spurious misfire. However the sequence of engine speed changes around the spurious detection are likely to cause one of the masks to be set to "discard". Thus the spurious misfire will be disregarded.

Figure 4A:
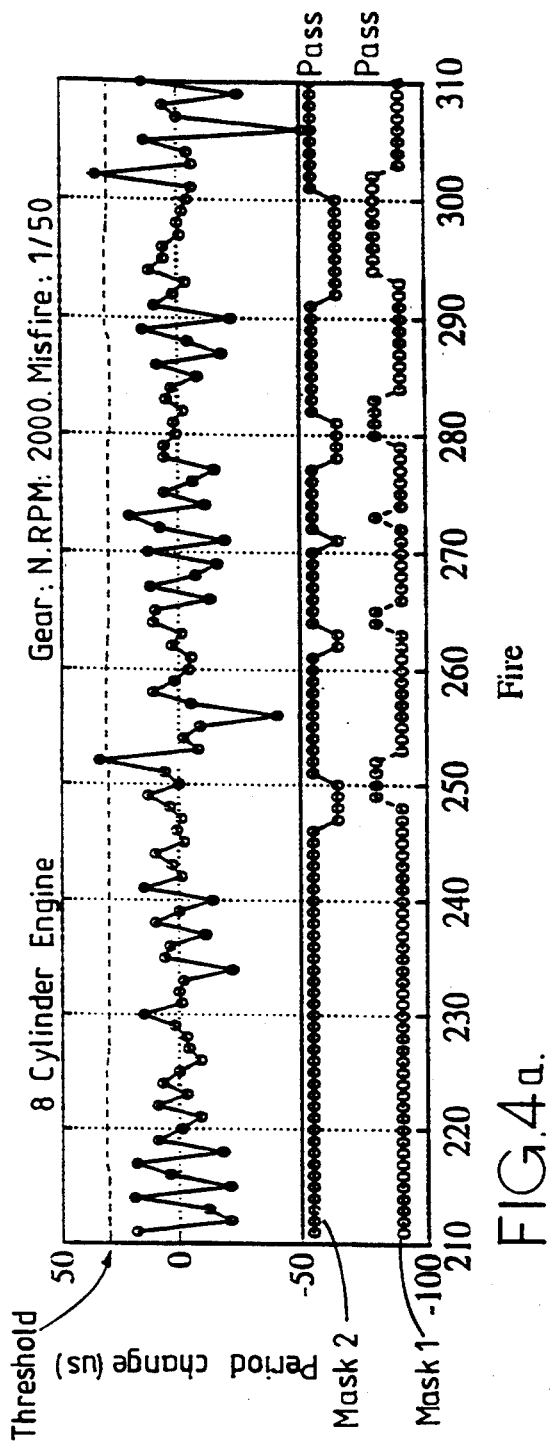
FIGS. 4a and 4b show data from an experiment using an 8 cylinder engine misfiring at every 50th combustion event.
Figure 4B:
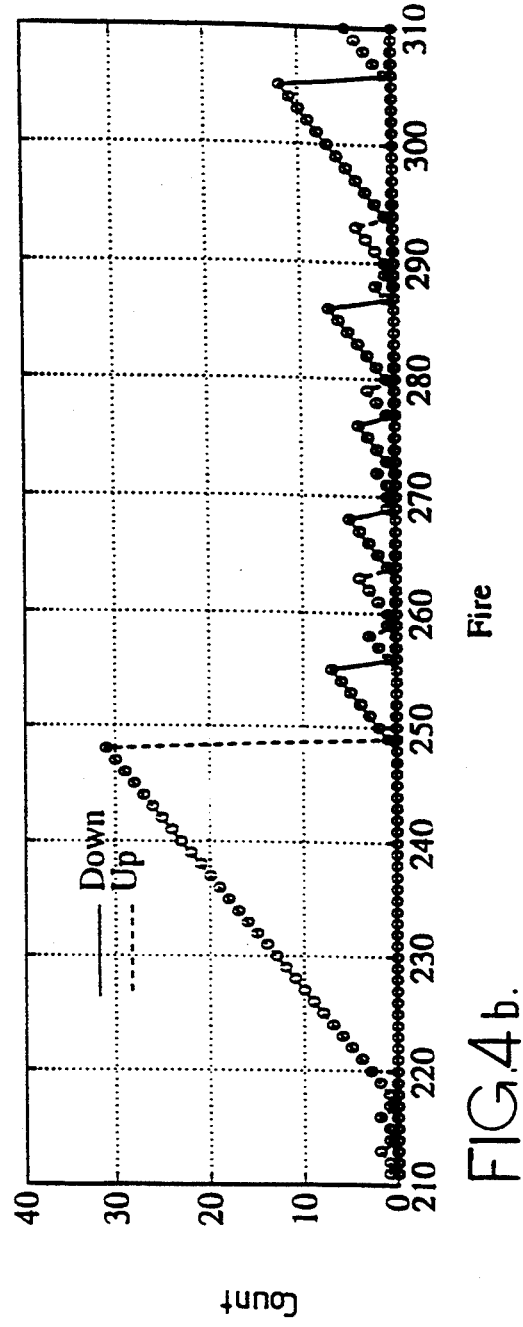

FIGS. 4a and 4b show similar data to that shown in FIGS. 3a and 3b. However the engine only misfires once in every 50 combustion events. All other experimental conditions are as for the data presented in FIGS. 3a and 3b. Again all indicated misfires are correctly allowed by the masks.

The misfire detection calculation and the rules for generating the first and second masks are application specific. For a 6 cylinder engine, misfire may be detected by comparing the result of $P_N-P_{N-1}-P_{N-3}+P_{N-4}$ with a threshold. A misfire is signalled when the result of the above calculation exceeds the threshold. The $P_N$ and the $P_{N-3}$ periods are compared to determine the appropriate control of the UP-COUNTER and the DOWN-COUNTER. If the UP-COUNTER is greater than or equal to one, then misfires occurring in the N, N-1 and N-2 periods are ignored. If the DOWN-COUNTER is greater than or equal to one, then misfires occurring in the N-4 period are ignored.

The period between passage of the teeth of the toothed wheel past the transducer 6, and the change in that period due to misfire, vary with engine speed. Thus the misfire detection threshold is also varied with engine speed to maintain reliable misfire detection over a wide range of engine speeds.

The variations in engine speed due to misfire result in small changes being made to the misfire detection threshold. As indicated by the small variations in the thresholds indicated on FIGS. 3a and 4a.

It is thus possible to filter out and discard a large proportion of false threshold crossings in the misfire detector, for instance, due to gear changes and decelerations. Thus the reliability of on-board diagnostic systems within a vehicle can be enhanced.

I claim:

1. A method for improving the reliability of detection of misfire in an internal combustion engine having a misfire detector and a cyclically moving part, the engine speed being measured by measuring a time period taken for the cyclically moving part to move a predetermined distance, said method comprising the steps of:
   examining a plurality of preceding speed changes to identify first and second patterns of speed changes characteristic of a misfire, the first pattern being identified by applying a first generating rule to an up-count which is incremented when an Nth period is less than an (N-X)th period, where N and X are integers and X is less than N; and
   signaling a misfire when said misfire detector detects a misfire and the first and second patterns of speed changes are present.

2. A method as claimed in claim 1, in which the second pattern is identified by applying a second generating rule to a down-count which is incremented when an Nth period is greater than or equal to a (N-Y)th period where N and Y are integers and Y is less than N.

3. A method as claimed in claim 2, characterised in that the down count is reset when the up-count in incremented and the up-count is reset when the down-count is incremented.

4. A method of discriminating misfire in an internal combustion engine having a cyclically moving part, the method comprising the steps of:
   making a series of measurements representing engine speed by measuring the time period taken for the cyclically moving part of the engine to move a predetermined distance;
   determining a series of speed differences from the speed measurements;
   inhibiting detection of misfire in response to a first pattern of speed differences which are greater than or equal to a first threshold, where the first threshold is greater than or equal to zero, and in which the first pattern is identified by applying a first generating rule to an up-count which is incremented when an Nth period is less than a (N-X)th period, where N and X are integers and X is less than N; and
   inhibiting detection in response to a second pattern of speed differences which are less than or equal to a second threshold, where the second threshold is less than or equal to zero.

5. A method as claimed in claim 4, in which the second pattern is identified by applying a second generating rule to a down-count which is incremented when an Nth period is greater than or equal to a (N-Y)th period where N and Y are integers and Y is less than N.

6. A method as claimed in claim 5, in which the down count is reset when the up-count in incremented and the up-count is reset when the down-count is incremented.

7. An apparatus for improving the reliability of detection of misfire in an internal combustion engine having a misfire detector and a cyclically moving part, an engine speed being measured by measuring a time period taken for the cyclically moving part to move a predetermined distance, said apparatus comprising:
   an up-counter which is incremented when an Nth period is less than a (N-X)th period, where N and X are integers and X is less than N;
   at least one speed processing device for examining a plurality of preceding engine speed changes to identify first and second patterns of speed changes characterized of a misfire, said at least one speed processing device being arranged to identify the first pattern by applying a first generating rule to said up-counter; and
   a signaling device for signaling a misfire when the misfire detector detects a misfire and the first and second patterns of speed changes are present.

8. An apparatus as claimed in claim 7, further comprising a down counter which is incremented when an Nth period is greater than or equal to a (N-Y)th period where N and Y are integers and Y is less than N, said speed processing device being arranged to identify the second pattern by applying a second generating rule to said down-counter.

9. An apparatus as claimed in claim 8, in which said down counter is reset when the up-count in incremented and said up-counter is reset when the down-count is incremented.

10. An apparatus as claimed in claim 8 for use with a K cylinder internal combustion engine where K is one of 6 and 8, in which the apparatus is arranged to inhibit detection of misfires associated with Nth to N-((K/2)-1)th periods when a magnitude of a count in said up-counter is greater than zero, and to inhibit detection of a misfire associated with a N-((K/2)+1)th period when a magnitude of a count in said down-counter is greater than 3 when K is 8 and greater than zero when K is 6.

11. An apparatus for discriminating misfire in an internal combustion engine having a cyclically moving part, said apparatus comprising:
- an engine speed sensor for making a series of measurements representing engine speed by measuring the time period taken for the cyclically moving part of the engine to move a predetermined distance;
- a data processor responsive to said speed sensor for determining a series of speed differences from the speed measurements;
- an up-counter which is incremented when an Nth period is less than a (N-X) the period, where N and X are integers and X is less than N; and
- at least one inhibiting device for inhibiting detection of misfire in response to a first pattern of speed differences which are greater than or equal to a first threshold, where the first threshold is gretaer than or equal to zero, and inhibiting detection in response to a second pattern of speed differences which are less than or equal to a second threshold, where the second threshold is less than or equal to zero, said at lesat one inhibiting device being arranged to identify said first pattern by applying a afirst generating rule to said up-counter.

12. An apparatus as claimed in claim 11, further comprising a down-counter which is incremented when an Nth period is greater than or equal to a (N-Y)th period where N and Y are integers and Y is less than N, said at least one inhibiting device being arranged to identify the second pattern by applying a second generating rule to said down-counter.

13. An apparatus as claimed in claim 12, in which said down counter is reset when the up-count in incremented and said up-counter is reset when the down-count is incremented.

14. An apparatus as claimed in claim 12 for use with a K cylinder internal combustion engine where K is one of 6 and 8, in which the apparatus is arranged to inhibit detection of misfires associated with Nth to N-((K/2)-1)th periods when a magnitude of a count in said up-counter is greater than zero, and to inhibit detection of a misfire associated with a N-((K/2)+1)th period when a magnitude of a count in said down-counter is greater than 3 when K is 8 and greater than zero when K is 6.

* * * * *